United States Patent Office
2,884,388
Patented Apr. 28, 1959

2,884,388

COATING COMPOSITIONS CONTAINING ORGANOSILOXANES

Robert C. Hedlund, Midland, Mich., assignor to Dow Corning Corporation, Midland, Mich., a corporation of Michigan No Drawing. Application October 21, 1955
Serial No. 542,107

5 Claims. (Cl. 260—3)

This invention relates to coating compositions capable of giving a hammer finish.

The term "hammer finish" as employed herein has reference to the type of finish in which the pigment aggregates during the drying of the film to give a mottled appearance to the surface. This finish is to be distinguished from a wrinkle finish wherein the surface is actually crinkled.

Prior to this invention it was possible to obtain one coat hammer finishes in a few resins such as styrenate alkyds. The hammer effect has been obtained by adjusting the solvent relative to the resin formulation. As the finish dried a segregation of the pigment took place. Hammer finishes are of particular utility as decorative finishes and in application to surfaces of base materials which contain flaws and irregularities such as machine marks. Such base members are much cheaper than those having perfect surfaces. However, if a plain finish is applied over surface flaws they are readily apparent. These flaws can be hidden if the surface had a mottled appearance. Hammer finishes are widely used in connection with office furniture and materials of that nature.

Prior to this invention hammer finishes were confined to specific baking enamels or to styrenate alkyd resins. There is a great demand, however, for a material which will produce a hammer finish in nitrocellulose and other types of lacquers which air dry and are cheaper than the alkyds.

It is the object of this invention to provide a material which will produce a hammer finish with all known types of coating resins. Another object is to provide a material which will air dry to give a hammer finish. Other objects and advantages will be apparent from the following description.

This invention relates to a composition of mattter comprising (1) a film-forming organic coating resin, (2) a metallic pigment in amount from .5–100 parts by weight per 100 parts by weight of the coating resin, and (3) from .01–2 parts by weight per 100 parts by weight of the coating resin of a benzene soluble organopolysiloxane of at least 50,000 cs. viscosity at 25° C., said siloxane having an average of from 1.99 to 2.01 hydrocarbon radicals per silicon atom and at least 50 percent of the polymer units in said siloxane being of the formula RMeSiO in which R is an aliphatic hydrocarbon radical of less than 4 carbon atoms and any remaining polymer units in said siloxane being of the formula $$R'_n SiO_{\frac{4-n}{2}}$$

in which $n$ has a value from 1–3 inclusive and R' is a monovalent hydrocarbon radical.

The compositions of this invention are prepared by mixing the above three ingredients in any suitable manner. Preferably the ingredients are dissolved or suspended in suitable solvents such as esters, aliphatic hydrocarbons, aromatic hydrocarbons, chlorinated hydrocarbons, ketones, alcohols and ethers.

For the purpose of this invention the film-forming organic coating resin can be any organic resin capable of forming a coating film. Specific examples of such organic film-forming coating resins which are operative herein are natural resins, shellac and drying oils; phenolic resins such as phenol-aldehyde resins and terpene-phenolic resins; coumarone-indene resins; alkyd resins such as polymers of phthalic anhydride and glycerine, terephthalic acid and pentaerythritol, esters of glycerine and unsaturated acids and copolymers of alkyd resins and styrene; epoxide resins such as condensation products of epichlorohydrin and bis-phenol; fatty acid modified urethane resins; aminoplast resins such as urea-formaldehyde resins, and melamine-formaldehyde resins; rubber resins such as chlorinated rubber, natural rubber and butadiene-styrene copolymers; cellulose coating resins such as cellulose nitrate, cellulose acetate, ethyl cellulose and cellulose butyrate; vinyl resins such as vinyl acetate, vinyl chloride, copolymers of vinyl acetate and vinylidene chloride, vinyl butyral resins and vinyl acetate-vinylalcohol resins; acrylonitrile resins; acrylic ester resins such as methylacrylate, methyl methacrylate and butylmethacrylate; silicone resins such as methylphenylsilicone resins; and modified silicone resins such as silicone modified alkyd resins, silicone modified phenolic acids, silicone modified epoxy resins and silicone modified aminoplast resins.

It should be understood that the film-forming organic coating compositions of this invention can be any combination of the above type materials either in the form of mixtures or copolymers.

In order to obtain the hammer effect of this invention the primary pigment in the resin should be a metallic pigment such as finely divided aluminum, copper, bronze, nickel, chromium and the like. The metallic pigment can be either in leafing or nonleafing form. If desired, the metallic pigment may be mixed with other pigments such as metal oxides, carbon black and organic pigments such as copper, phthalocyanine and toluidine red.

In order to obtain the effects of this invention the metallic portion of the pigment should be present in amount of from .5–100 parts by weight based upon 100 parts by weight of the coating resin. Satisfactory hammer finishes are not obtained when the amount of metallic pigment is above or below these amounts. The amount of non-metallic pigment present is not critical although obviously the combined pigments should be present in amount to give satisfactory coating of the finished composition.

The polysiloxanes employed in this invention must have a viscosity of at least 50,000 cs. at 25° C. and must be present in amount at least 0.1 part per 100 parts by weight of the coating resin. Furthermore the siloxane should have an average degree of substitution of from 1.99 to 2.01 hydrocarbon radicals per silicon. Primarily the operative siloxanes are methyl lower aliphatic hydrocarbon siloxanes of the unit formula RMeSiO in which R can be, for example, methyl, ethyl, propyl, vinyl or allyl. Thus it can be seen that the siloxanes of this invention can be dimethylsiloxane, ethylmethylsiloxane, methylvinylsiloxane, methylpropylsiloxane and methylallylsiloxane or copolymers thereof.

In addition the siloxanes of this invention may contain up to 50 mol percent polymer units of the type $R'SiO_{3/2}$, $R'_2SiO$ and $R'_3SiO_{1/2}$ in which R' is any monovalent hydrocarbon radical such as alkyl radicals such as methyl, ethyl, propyl and octadecyl; alkenyl radicals such as vinyl, allyl and hexenyl; cycloaliphatic hydrocarbon radicals such as cyclohexyl and cyclohexenyl; aralkyl hydrocarbon radicals such as benzyl and aromatic hydrocarbon radicals such as phenyl, tolyl, xenyl and naphthyl.

Preferably the organopolysiloxanes employed herein are dimethylpolysiloxane, ethylmethylpolysiloxane and methylvinylpolysiloxane and copolymers thereof, together with copolymers of these siloxanes containing up to 35 mol percent phenylsiloxanes, lower alkylsiloxanes and phenyl lower alkylsiloxanes. Satisfactory hammer finishes are not obtained by employing siloxanes outside the scope of the above definition. Thus, for example, homopolymers of diethylsiloxane do not give a satisfactory hammer finish nor do homopolymers of phenylmethylsiloxane.

The coating compositions of this invention perform satisfactorily on any type of base member to which they adhere. Thus the hammer finish may be applied to metals, wood, paper, ceramic or organic resin surfaces. The compositions can be applied to these surfaces in any convenient manner such as by brushing, dipping or spraying. However, the best results are obtained by spraying. The aggregation of the pigment to give the hammer finish occurs spontaneously upon application of the coating to the base member and normally appears within a few seconds after the application. It is immaterial for the purposes of this invention whether the coating is of the air drying type or requires baking.

The following examples are illustrative only and should not be construed as limiting the invention which is properly set forth in the appended claims.

*Example 1*

A series of paints were prepared employing 5 parts by weight of nonleafing aluminum powder per 100 parts by weight of the coating resins described in the table below. The mixtures were diluted with solvent to give a viscosity of 60 seconds No. 4 Ford cup. A xylene dispersion of a mixture of 72 percent by weight of a polysiloxane gum having the composition 95 mol percent dimethylsiloxane and 5 mol percent phenylmethylsiloxane and 28 percent by weight of a fume silica was then added to the resin-pigment composition in amount to give .03 part by weight siloxane per 100 parts by weight of the coating resin.

Each of the paints was then sprayed upon steel panels and allowed to air dry or baked if necessary, to give a tack-free surface. In each case a good hammer finish was obtained. The coating resins employed were as follows:

(1) A mixture of 85% by weight of a soya bean oil modified glycerine-phthalic anhydride resin and 15% by weight of a melamine-formaldehyde resin,
(2) 85% by weight of a coconut oil modified glycerine-phthalic anhydride resin and 15% by weight of a melamine-formaldehyde resin,
(3) An air drying linseed oil modified glycerine-phthalic anhydride resin,
(4) A polymethylmethacrylate resin,
(5) Linseed oil,
(6) 50% nitrocellulose and 50% of a coconut oil modified glycerine-phthalic anhydride resin,
(7) 70% by weight of an epichlorohydrin-bisphenol condensation product and 30% of an urea-formaldehyde resin,
(8) A methylphenylpolysiloxane resin,
(9) A condensation product of 75% by weight of a phenylmethylpolysiloxane and 25% by weight of a glycerine-phthalic anhydride resin, and
(10) A condensation product of 48% by weight of a phenylmethylpolysiloxane and 52% by weight of a linseed oil modified phenol-formaldehyde resin.

Coatings 1, 2, 7, 8 and 9 were baked while the remaining resins were air dried. In all cases satisfactory hammer finishes were obtained.

*Example 2*

The composition employed in this example was as follows in parts by weight:

19 parts of a 65% by weight solution of nitrocellulose, ½ second R.S., in ethyl alcohol,
10 parts of a 60% by weight xylene solution of a coconut oil modified glycerine-phthalic anhydride resin,
2 parts dibutylphthalate,
6 parts of the monoethyl ether of ethylene glycol,
20 parts xylene,
20 parts methylisobutylketone,
21 parts methylethylketone,
2 parts of a nonleafing aluminum pigment and .5 part of a 10% by weight xylene solution of one of the silicones described below.

Each of the formulations had a viscosity of 43 seconds No. 4 Ford cup and each was sprayed onto aluminum panels and allowed to air dry.

The siloxanes employed were as follows:

(1) A gum composed of 96 mol percent dimethylsiloxane and 4 mol percent vinylmethylsiloxane,
(2) A dimethylpolysiloxane gum,
(3) A copolymer gum composed of 70 mol percent dimethylsiloxane and 30 mol percent phenylmethylsiloxane,
(4) An ethylmethylpolysiloxane gum and
(5) A 100,000 cs. trimethyl endblocked dimethylpolysiloxane fluid.

In each case a satisfactory hammer finish was obtained.

*Example 3*

A satisfactory hammer finish was obtained when a leafing bronze pigment was substituted in the composition of Example 2. Satisfactory results were also obtained when a leafing aluminum pigment was employed in the composition of that example.

*Example 4*

Satisfactory hammer finishes are obtained when the following compositions are applied to wood, paper and metal surfaces. The compositions shown give the relative proportions of essential ingredients in parts by weight. The compositions were diluted to suitable viscosities with solvents before application to the various surfaces.

| Parts | Coating Resin | Parts | Pigment | Parts | Silicone |
|---|---|---|---|---|---|
| 100 | Styrenated-linseed oil-glycerine-phthalic anhydride resin. | 50 | Copper powder | 1 | 1,000,000 cs. methyl-vinylpolysiloxane. |
| 100 | Coumarone-indene copolymer. | 25 | Nickel powder | .05 | 100,000 cs. copolymer of 25 mol percent diethylsiloxane and 75 mol percent dimethylsiloxane. |
| 100 | Copolymer of vinyl chloride and vinylacetate. | 10 | Aluminum powder | .5 | 100,000 cs. propylmethylsiloxane fluid. |
| 100 | Chlorinated rubber | 25 | ...do... | .5 | 100,000 cs. fluid copolymer of .5 mol percent monomethylsiloxane, 8 mol percent octadecylmethylsiloxane and 91.5 mol percent dimethylsiloxane. |

*Example 5*

The composition of Example 2 was repeated employing siloxane (1) except that .5 part of chlorinated copper phthalocyanine to impart a green color, was added. A satisfactory hammer finish was obtained.

That which is claimed is:

1. A composition of matter comprising (1) an organic film-forming coating resin, (2) a metallic pigment in amount from .5–100 parts by weight per 100 parts by weight of the coating resin, and (3) from .01–2 parts by weight per 100 parts by weight of the coating resin of a benzene soluble organopolysiloxane of at least 50,000 cs. viscosity at 25° C., said siloxane having on the average from 1.99 to 2.01 monovalent hydrocarbon radicals per silicon atom, at least 50 percent of the polymer units in said siloxane being of the formula RMeSiO in which Me is the methyl radical and R is an aliphatic hydrocarbon radical of less than 4 carbon atoms and any remaining polymer units being of the formula $$R'_n SiO_{\frac{4-n}{2}}$$

in which R' is a monovalent hydrocarbon radical of from 1 to 18 inclusive carbon atoms and $n$ has a value from 1–3 inclusive.

2. A composition in accordance with claim 1 wherein siloxane (3) is dimethylsiloxane.

3. A composition in accordance with claim 1 wherein the siloxane (3) is methylethylsiloxane.

4. A composition in accordance with claim 1 wherein the siloxane (3) is a copolymer of dimethylsiloxane and methylvinylsiloxane.

5. A composition in accordance with claim 1 wherein siloxane (3) is a copolymer of dimethylsiloxane and up to 50 mol percent phenylmethylsiloxane.

References Cited in the file of this patent

UNITED STATES PATENTS

| | | |
|---|---|---|
| 2,523,065 | Sage | Sept. 19, 1950 |
| 2,584,344 | Goodwin | Feb. 5, 1952 |
| 2,724,704 | Millar | Nov. 22, 1955 |

OTHER REFERENCES

Burrel: Organic Finishing, volume 16, No. 12, pages 15–20.